United States Patent [19]

Wawrzyniak

[11] 4,412,764
[45] Nov. 1, 1983

[54] DOUBLE ENDED TAP

[76] Inventor: Walter W. Wawrzyniak, 39230 Gary, Mt. Clemens, Mich. 48043

[21] Appl. No.: 205,799

[22] Filed: Nov. 10, 1980

[51] Int. Cl.³ .................. B23B 31/08; B23B 31/12; B23G 11/00; B25G 3/20
[52] U.S. Cl. ............................ 408/226; 279/22
[58] Field of Search .......... 408/141, 222, 226, 239 A, 408/239 R; 279/9, 16, 18, 76, 75, 22, 83, 97, 104; 10/89 F, 141 H

[56] References Cited

U.S. PATENT DOCUMENTS

| 371,015 | 10/1887 | Wike | 408/222 |
|---|---|---|---|
| 412,952 | 10/1889 | Elterich | 408/222 |
| 1,953,830 | 4/1934 | Park | 279/75 |
| 2,089,930 | 8/1937 | Carlson | 279/83 |
| 2,641,478 | 6/1953 | Sigg | 279/9 |
| 3,171,145 | 3/1965 | Benjamin et al. | 408/139 |
| 3,334,366 | 8/1967 | Schrolucke | 408/141 |
| 3,436,086 | 4/1969 | Glenzer | 279/75 |
| 3,531,810 | 10/1970 | Fure | 408/199 |
| 3,652,099 | 3/1972 | Bilz | 279/75 |
| 3,879,046 | 4/1975 | Alford | 279/1 L |
| 4,111,442 | 9/1978 | Wawrzyniak | 279/16 |
| 4,131,165 | 12/1978 | Wanner et al. | 279/75 |

FOREIGN PATENT DOCUMENTS 2640767  3/1978  Fed. Rep. of Germany ........ 279/22

Primary Examiner—Robert E. Garrett
Assistant Examiner—Paul M. Heyrana, Sr.
Attorney, Agent, or Firm—Barnes, Kisselle, Raisch, Choate, Whittemore & Hulbert

[57] ABSTRACT

A double ended tap having threaded portions at both ends thereof which may include a centering recess in each end and fluted portions which aid in securing the tap to a tool holder, and a tool holder in combination with the double ended tap and means for securing either end of the double ended tap to the tool holder.

9 Claims, 10 Drawing Figures

DOUBLE ENDED TAP

BACKGROUND OF THE INVENTION

1. Field of the Invention

The invention relates to taps and refers more specifically to a double ended tap, both ends of which may be used for the purpose of cutting threads, and a tool holder for holding the tap by either end thereof and imparting torque thereto to effect cutting therewith.

2. Description of the Prior Art

In the past, taps have been single ended tools including threads on one end and a shank on the other. With such structure, the shanks are especially designed to be held in tool holders which impart rotation to the taps for effecting cutting of threads with the threaded end of the tap.

Such taps having particular configurations at the opposite ends for cutting threads and to promote holding of the tap by a tool holder while torque is imparted to the tap are wasteful of material and machining time in the manufacture thereof and are therefore expensive.

SUMMARY OF THE INVENTION

In accordance with the invention, a double ended tap is provided having the same configuration at both ends of the tap permitting securing of the tap to a tool holder and the imparting of torque to the tap from either end thereof. The taps of the present invention thus have double life and are therefore particularly economical, convenient and efficient.

In accordance with the invention, the double ended taps are threaded at both ends, are provided with axial flutes which may extend the entire length thereof, and may have small recesses in their ends. The flutes are normal tap flutes or may have a special radius to facilitate driving of the tap, and are utilized to secure the taps to a tool holder and/or to impart torque to the tap from the tool holder. The small recesses in the ends of the taps are utilized to center the taps in the tool holder.

The tool holder for use with the double ended tap is utilized in conjunction with a quick disconnect coupling having radially movable balls therein which may cooperate with the flutes of the double ended tap to secure the tap to a tool holder and to impart torque from the tool holder to the tap. In addition, the tool holder may have axially extending studs therein positioned to be received in the flutes in one end of the double ended tap to transfer torque between the tap and the tool holder.

Further, pin and slot structure may be provided between the quick disconnect coupling and the tool holder for securing the coupling to the tool holder for axial movement relative thereto whereby torque may be transferred between the quick disconnect coupling and the tool holder in accordance with the invention.

DESCRIPTION OF THE PREFERRED EMBODIMENT

Figure 1:
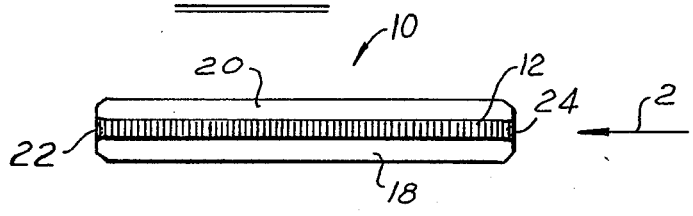
FIG. 1 is a longitudinal elevation view of a double ended tap constructed in accordance with the invention.
Figure 2:
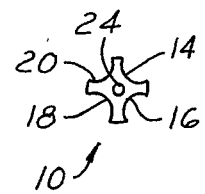
FIG. 2 is an end view of the double ended tap of FIG. 1, taken substantially in the direction of arrow 2 in FIG. 1.

As shown best in FIG. 1, the double ended tap 10 of the invention is a cylindrical metal member having a thread cutting configuration 12 on both ends thereof. The tap 10 further includes a plurality of flutes 14, 16, 18 and 20 angularly spaced thereabout extending axially thereof on the exterior surface of the tap for the entire length of the tap 10.

Figure 3:
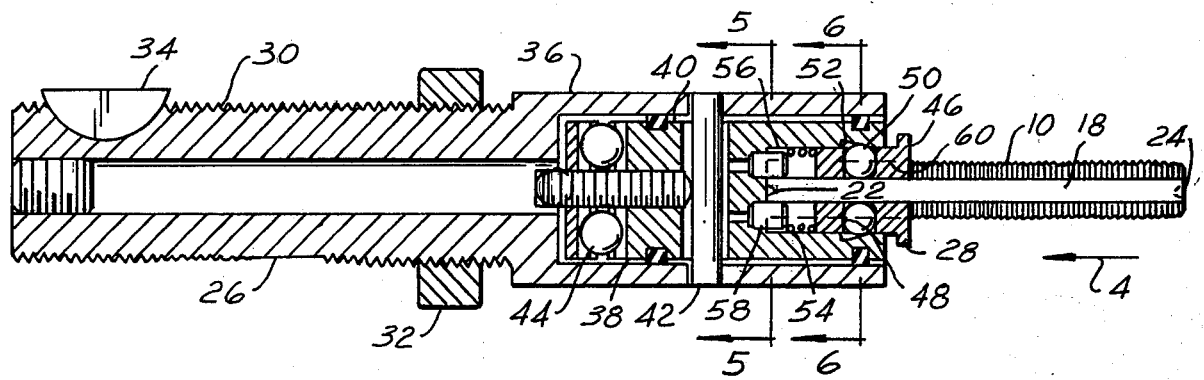
FIG. 3 is a longitudinal section view of a tool holder and a quick disconnect coupling for securing a double ended tap to the tool holder and a double ended tap in combination with the quick disconnect coupling and tool holder, all constructed in accordance with the invention.
Figure 4:
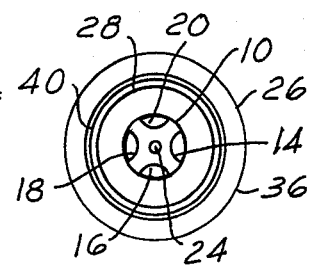
FIG. 4 is an end view of the tool holder, quick disconnect coupling and double ended tap illustrated in FIG. 3, taken substantially in the direction of arrow 4 in FIG. 3.

As shown best in FIG. 3, the tap 10 may be utilized in combination with tool holder 26 and quick disconnect coupling 28 as desired whereby the tap 10 may be secured to the tool holder by the coupling at either end and threads cut in an opening in a workpiece with the other end of the tap. The tool holder 26 and/or the quick disconnect coupling 28 include specific structure by which torque may be imparted to the tap 10 and by which the tap 10 may be held by either end thereof while torque is imparted to the tap. Thus, both ends of the tap 10 may be utilized for threading openings and the like to improve the economy and efficiency of threading openings with taps.

More specifically, the tool holder 26, which is disclosed in more detail in applicant's U.S. Pat. No. 4,111,442, the disclosure of which is incorporated herein by reference, includes the shank 30 adapted to be held in a spindle or the like in an adjusted position as determined by the nut 32 to which torque is imparted by means of the key 34.

The tool holder 26 further includes the body portion 36 having the recess 38 therein for receiving the floating structure 40. The floating structure 40 is secured in the recess 38 by pin 42.

Torque is transferred between the body portion 36 of the tool holder 26 and the floating structure 40 by the ball and crossed slot arrangement 44, as described in more detail in U.S. Pat. No. 4,111,442.

Figure 6:
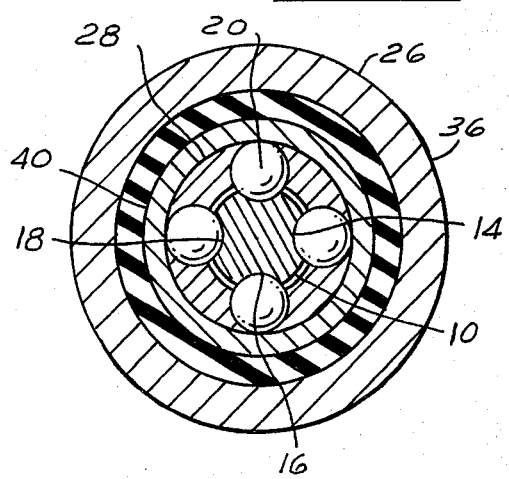
FIG. 6 is an enlarged cross section of the structure illustrated in FIG. 3, taken substantially on the line 6—6 in FIG. 3.

The quick disconnect coupling 28 for securing the tap 10 to the tool holder 26 includes the sleeve 46 having radially extending openings 48 therein for receiving radially movable balls 50, as shown best in FIGS. 3 and 6. The floating member 40 further includes the internal annular groove 52 therein for partly receiving balls 50.

A resilient spring 54 is positioned in recess 56 in floating structure 40 for urging the quick disconnect coupling 28 out of the recess 56, as shown.

Figure 5:
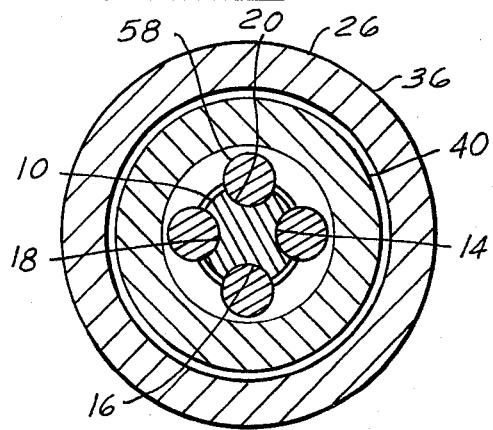
FIG. 5 is an enlarged cross section of the structure illustrated in FIG. 3, taken substantially on the line 5—5 in FIG. 3.

Two diametrically opposed aligning and torque transfer studs 58 are secured in the bottom of the recess 56, as shown best in FIG. 5. Studs 58 are received in the end of two of the four flutes 14, 16, 18 and 20 of a tap 10 secured to the tool holder 26 by the quick disconnect coupling 28. Alternatively, if more drive strength is required, four studs may be provided. Further, three studs may be provided if desired in three fluted taps.

Thus, in use of the tap 10, in conjunction with the tool holder 26 and quick disconnect coupling 28, the quick disconnect coupling 28 is moved to the left, as shown in FIG. 3, against the force of the spring 54 and either end of a tap 10 is inserted in the mating internal opening 60 through the quick disconnect coupling structure 28, and the tap 10 is rotated to align the flutes thereof with the studs 58.

With the inner end of the tap 10 thus angularly positioned with the studs 58 in the flutes of the tap, the quick disconnect coupling 28 is released, whereby the coupling 28 is forced outwardly of the recess 56 to cause the balls to move radially into engagement with the sloped sides of annular recess 52 in the floating member 40 of the tool holder 26 whereby the balls move radially inwardly in the openings 48 to grip the tap 10 to prevent axial removal of the tap 10 from the tool holder 26.

In insertion of the tap 10 through the quick disconnect coupling 28 past the balls 50, the tap may be rotated angularly to align the flutes of the tap 10 with the balls 50 to permit passage of the tap 10 past the balls 50 into the recess 56.

After the outer end of the tap, as shown in FIG. 3 has been utilized to the point where with the usual single ended tap the tap would be discarded, the quick disconnect coupling 28 is again moved to the left in FIG. 3 and the ends of the tap 10 are reversed to again lock the tap in position on the tool holder 26 for cutting with the unused end of the tap as set forth above. Thus, the tap 10 need not be discarded or resharpened until both ends thereof have been completely utilized, whereby the life of the tap is greatly increased.

Figure 7:
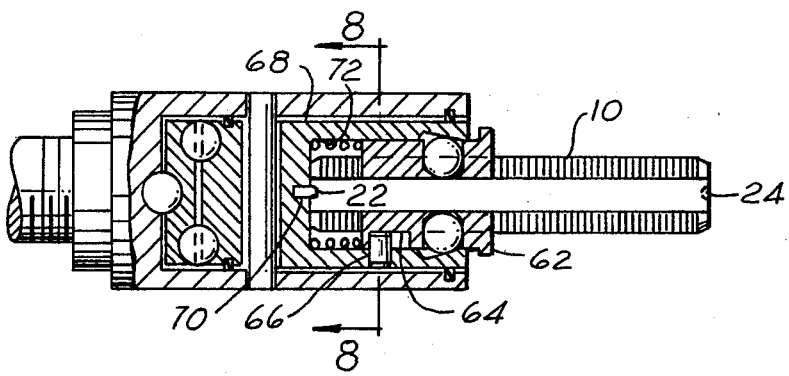
FIG. 7 is a partial longitudinal section view of a modified tool holder and a quick disconnect coupling for use with a double ended tap, as shown in FIGS. 1 and 2.
Figure 8:
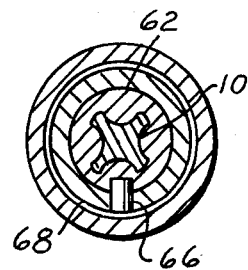
FIG. 8 is a cross section of the modified structure of FIG. 7, taken substantially on the line 8—8 in FIG. 7.

In the modified structure as shown in FIG. 7, the same tap 10 is utilized in conjunction with a quick disconnect coupling 62 having an internal cross section which is the same as the external cross section of the ends of the tap and a slot 64 therein receiving pin 66 in the floating structure 68 whereby torque is transmitted between the coupling and tap by the interfitting cross sections thereof and between the floating structure 68 and the quick disconnect coupling 62 through the pin and slot connection while axial movement between the quick disconnect coupling 62 and floating structure 68 to release and insert the tap 10 is permitted. Also as shown best in FIG. 7, a pin 70 is positioned in the bottom of the recess 72 in the floating structure 68 to receive the recess 22 of the tap 10 to center the tap 10 in the floating structure 68.

Figure 9:
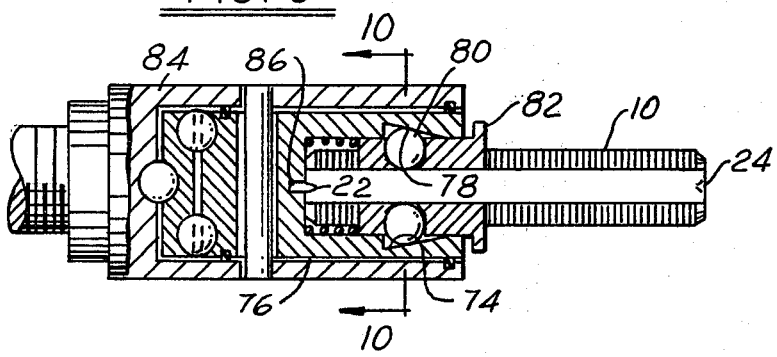
FIG. 9 is a partial longitudinal section view of another modified tool holder and quick disconnect coupling for use with the double ended tap as shown in FIGS. 1 and 2.
Figure 10:
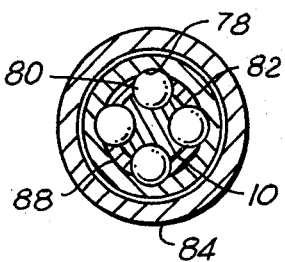
FIG. 10 is a cross section of the modified structure of FIG. 9, taken substantially on the line 10—10 in FIG. 9.

Alternatively, as shown best in FIGS. 9 and 10, the annular recess 74 in the modified floating structure 76 may include pockets 78 therein in which the balls 80 are positioned whereby torque is transferred between the floating structure 76 and the tap 10. Again, the recess 22 in the tap 10 may be utilized in conjunction with a pin 86 to center the tap 10 on the floating structure 76.

While one embodiment of the present invention has been considered in detail, together with modifications thereof, it will be understood that other embodiments and modifications of the invention are contemplated. Thus, it is not desired to limit the invention to double ended taps, but to extend it to other devices, especially other cutting tools presently being utilized as single ended devices. It is the intention to include all the embodiments and modifications of the invention as are defined by the appended claims within the scope of the invention.

What is claimed is:

1. A double ended elongated cutting tool having longitudinally extending flutes in the surface thereof over at least a portion of both ends thereof, a tool holder having an axially extending recess in one end thereof including at least one radially extending recess in the inner surface having a frusto conical surface converging outwardly of the axially extending recess for receiving either end of the cutting tool and a quick disconnect coupling operable between the cutting tool and tool holder for releasably securing either end of the cutting tool to the tool holder comprising a hollow cylindrical member having a smooth cylindrical inner surface adapted to be sleeved over either end of the cutting tool and positioned within the recess in the one end of the tool holder between the cutting tool and the tool holder, transverse openings extending radially through the hollow cylindrical member, radially movable balls positioned in the transverse openings in the hollow cylindrical member extending into the radially extending recess in the inner surface of the axially extending recess in the tool holder and engaging the tool holder on the frusto conical surface in the radially extending recess and the cutting tool in the flutes thereof with the hollow cylindrical member in a limiting position extending out of the tool holder to lock the cutting tool within the axially extending recess in the tool holder against axial movement with respect to the tool holder, resilient means operable between the bottom of the axially extending recess and the hollow cylindrical member urging the hollow cylindrical member into its limiting position extending out of the tool holder and means operable between the tool holder and cutting tool for preventing relative rotation between the tool holder and cutting tool.

2. Structure as set forth in claim 1, wherein the means operable between the tool holder and cutting tool for preventing relative rotation between the tool holder and cutting tool comprises cylindrical studs positioned in the bottom of the axially extending recess in the tool holder constructed and arranged to fit within the ends of the flutes in the one end of the cutting tool with the one end of the cutting tool positioned within the axially extending recess in the tool holder.

3. Structure as set forth in claim 1, wherein the means operable between the tool holder and cutting tool for preventing relative rotation between the tool holder and cutting tool comprises slot and pin structure operable between the tool holder and hollow cylindrical member permitting relative axial movement therebetween while preventing relative rotation therebetween.

4. Structure as set forth in claim 1, wherein the radially extending recess is divided into separate pockets for receiving each of said balls to prevent relative rotation between the tool holder and the cutting tool.

5. Structure as set forth in claim 1, wherein the double ended cutting tool is a tap.

6. A tool holder comprising a body portion having an axially extending recess in one end thereof and a shank at the other end thereof, floating structure positioned within the axially extending recess in the one end of the body member including a recess in one end thereof and means at the other end thereof for securing the floating member in the recess in the body member against axial movement within the recess and rotation relative to the body member and means operable between the body member and floating structure for permitting relative inclination of the floating member axis and the body member axis, a double ended tap including axially extending flutes in both ends thereof, one end of which is inserted in the recess in the floating structure and a quick disconnect coupling positioned between the one end of the double ended tap and the floating structure within the recess in the one end of the floating structure comprising a hollow cylindrical member having a smooth cylindrical inner surface including an outwardly converging frusto conical radially extending recess therein sleeved over the one end of the tap, radially extending openings through the hollow cylindrical member, balls positioned within the radially extending openings having a diameter larger than the thickness of the hollow cylindrical member engageable with the one end of the tap within the flutes and with the frusto conical inner surface of the floating structure hollow cylindrical member to secure the tap within the recess in the floating structure with the hollow cylindrical member in one axial outer limiting position thereof and spring means operable between the inner end of the hollow cylindrical member and the bottom of the axially extending recess in the floating structure for urging the hollow cylindrical member into its axially outer position and means operably between the hollow cylindrical member of the quick disconnect coupling and the floating structure of the tool holder for preventing relative rotation therebetween.

7. Structure as set forth in claim 6, wherein the means operable between the hollow cylindrical member and the floating structure for preventing relative rotation therebetween comprises cylindrical studs positioned in the bottom of the axially extending recess in the floating structure constructed and arranged to fit within the ends of the flutes in the cutting tool with the cutting tool positioned within the axially extending recess in the floating structure.

8. Structures as set forth in claim 6, wherein the means operable between the hollow cylindrical member and the floating structure for preventing relative rotation therebetween comprises slot and pin structure operable therebetween for permitting relative axial movement therebetween while preventing relative rotation therebetween.

9. Structure as set forth in claim 6, wherein the radially extending recess is divided into separate pockets for receiving each of said balls to prevent relative rotation between the hollow cylindrical member and the floating structure.

* * * * *